US008074241B2

(12) United States Patent
Arfidsson et al.

(10) Patent No.: US 8,074,241 B2
(45) Date of Patent: Dec. 6, 2011

(54) PROCESS FOR DISPLAYING AND NAVIGATING PANORAMIC VIDEO, AND METHOD AND USER INTERFACE FOR STREAMING PANORAMIC VIDEO AND IMAGES BETWEEN A SERVER AND BROWSER-BASED CLIENT APPLICATION

(75) Inventors: Joakim Arfidsson, Palo Alto, CA (US); Hendrik Dahlkamp, Palo Alto, CA (US); Andrew Lookingbill, Palo Alto, CA (US); Sebastian Thrun, Stanford, CA (US)

(73) Assignee: The Board of Trustees of the Leland Stanford Jr. University, Palo Alto, CA (US)

( * ) Notice: Subject to any disclaimer, the term of this patent is extended or adjusted under 35 U.S.C. 154(b) by 827 days.

(21) Appl. No.: 12/047,160

(22) Filed: Mar. 12, 2008

(65) Prior Publication Data
US 2008/0244648 A1    Oct. 2, 2008

Related U.S. Application Data

(60) Provisional application No. 60/909,211, filed on Mar. 30, 2007.

(51) Int. Cl.
*G06F 3/00*    (2006.01)
(52) U.S. Cl. ............................................. 725/38; 725/91
(58) Field of Classification Search .................... 725/93, 725/116, 141; 715/757
See application file for complete search history.

(56) References Cited

U.S. PATENT DOCUMENTS

| 5,708,469 A |   | 1/1998 | Herzberg |
| 5,995,095 A | * | 11/1999 | Ratakonda .................... 715/255 |
| 6,734,884 B1 | * | 5/2004 | Berry et al. .................... 715/848 |
| 6,788,333 B1 | * | 9/2004 | Uyttendaele et al. ........... 348/36 |

(Continued)

FOREIGN PATENT DOCUMENTS
WO        99/59026 A2    11/1999

OTHER PUBLICATIONS

Oulasvirta, A., et al., "Embodied interaction with a 3D versus 2D mobile map", Personal and Ubiquitous Computing, Springer-Verlag London Limited, vol. 13, No. 4, Jul. 8, 2008, pp. 303-320.*

(Continued)

*Primary Examiner* — Andrew Koenig
*Assistant Examiner* — Alfonso Castro
(74) *Attorney, Agent, or Firm* — Wong, Cabello, Lutsch, Rutherford & Brucculeri, LLP

(57) ABSTRACT

A method for providing panoramic videos and images to a user using a server-client architecture while minimizing the wait time necessary before still images are available for viewing or videos begin playing. A series of location-referenced panoramic images are separated into one-dimensional tracks. Intuitive user controls are provided which allow the user to start and stop video playback, step through the panoramas in a track one at a time, and change the viewing orientation within the panorama. A video will start playing as soon as the video files for the preferred projected cube faces have been downloaded. This delay is reduced by storing the videos as keyframe distance files for opposing directions for each cube face and further reduced by encoding videos with different starting points so that they are staggered by a portion of the keyframe distance.

24 Claims, 9 Drawing Sheets

U.S. PATENT DOCUMENTS

| | | |
|---|---|---|
| 7,082,572 B2 | 7/2006 | Pea et al. |
| 7,096,428 B2 * | 8/2006 | Foote et al. .................. 715/721 |
| 2002/0021353 A1 | 2/2002 | DeNies |
| 2002/0063709 A1 | 5/2002 | Gilbert et al. |
| 2003/0063133 A1 | 4/2003 | Foote et al. |
| 2003/0179923 A1 | 9/2003 | Xiong et al. |
| 2005/0207672 A1 | 9/2005 | Bernardo et al. |
| 2007/0030396 A1 * | 2/2007 | Zhou et al. .................. 348/700 |
| 2007/0204014 A1 * | 8/2007 | Greer et al. .................. 709/219 |
| 2008/0033641 A1 * | 2/2008 | Medalia ....................... 701/209 |

OTHER PUBLICATIONS

Kimber, et al.; "FlyAbout: Spatially Indexed Panoramic Video," Proceedings of the ninth ACM international conference on Multimedia; 2001; pp. 339-347.*

International Search Report, dated Aug. 7, 2008, in corresponding case WO2008/121560.

Supplementary European Search Report, dated Sep. 1, 2010, in corresponding case EP2143267.

* cited by examiner

PROCESS FOR DISPLAYING AND NAVIGATING PANORAMIC VIDEO, AND METHOD AND USER INTERFACE FOR STREAMING PANORAMIC VIDEO AND IMAGES BETWEEN A SERVER AND BROWSER-BASED CLIENT APPLICATION

CROSS REFERENCE TO RELATED APPLICATIONS

This application claims the benefit under 35 U.S.C. §119 (e) of U.S. Provisional Patent Application Ser. No. 60/909, 211, entitled "Process for Displaying and Navigating Panoramic Video and Method and User Interface for Streaming Panoramic Video and Images Between a Server and a Browser-Based Client Application" by Joakim Arfvidsson, Hendrik Dahlkamp, Andrew Lookingbill and Sebastian Thrun, filed Mar. 30, 2007, which is hereby incorporated by reference.

BACKGROUND OF THE INVENTION

1. Field of the Invention

The invention relates to providing panoramic video, and more particularly to providing it between a server and a user over a network.

2. Description of the Related Art

For the purpose of allowing a user to explore a dataset consisting of many location-referenced image panoramas in an immersive manner, a responsive, intuitive user interface and a client-server architecture that minimizes user wait time are critical.

SUMMARY OF THE INVENTION

The present invention provides a method for providing panoramic videos and images to a user using a server-client architecture while minimizing the wait time necessary before still images are available for viewing or videos begin playing. A series of location-referenced panoramic images are assumed to be available. These panoramas are separated, based on their real-world locations, into tracks. These tracks are one-dimensional, and might include all the panoramas corresponding to moving down a city block, for example.

While viewing a panorama within a track, a user may move to the panorama on any side of the current panorama, or initiate playback of a video sequence that contains imagery from every panoramic node on the track. These tracks meet at intersections, where users may select from the available tracks and begin traversal of another track.

A set of intuitive user controls are provided which allow the user to start and stop video playback, step through the panoramas in a track one at a time, and change the viewing orientation within the panorama.

A method is provided for reducing the amount of time a user must wait for video playback to start once playback has been initiated. The video will start playing as soon as the video files for the preferred cube faces have been downloaded up to the frame that contains the desired imagery. This delay is reduced by storing the videos as keyframe distance length files for opposing directions for each cube face and further reduced by encoding videos with different starting points so that they are staggered by a portion of a keyframe distance. Although server-side storage requirements are increased due to the added redundancy of the data, user wait time is reduced.

DETAILED DESCRIPTION OF THE PREFERRED EMBODIMENT

Figure 1:
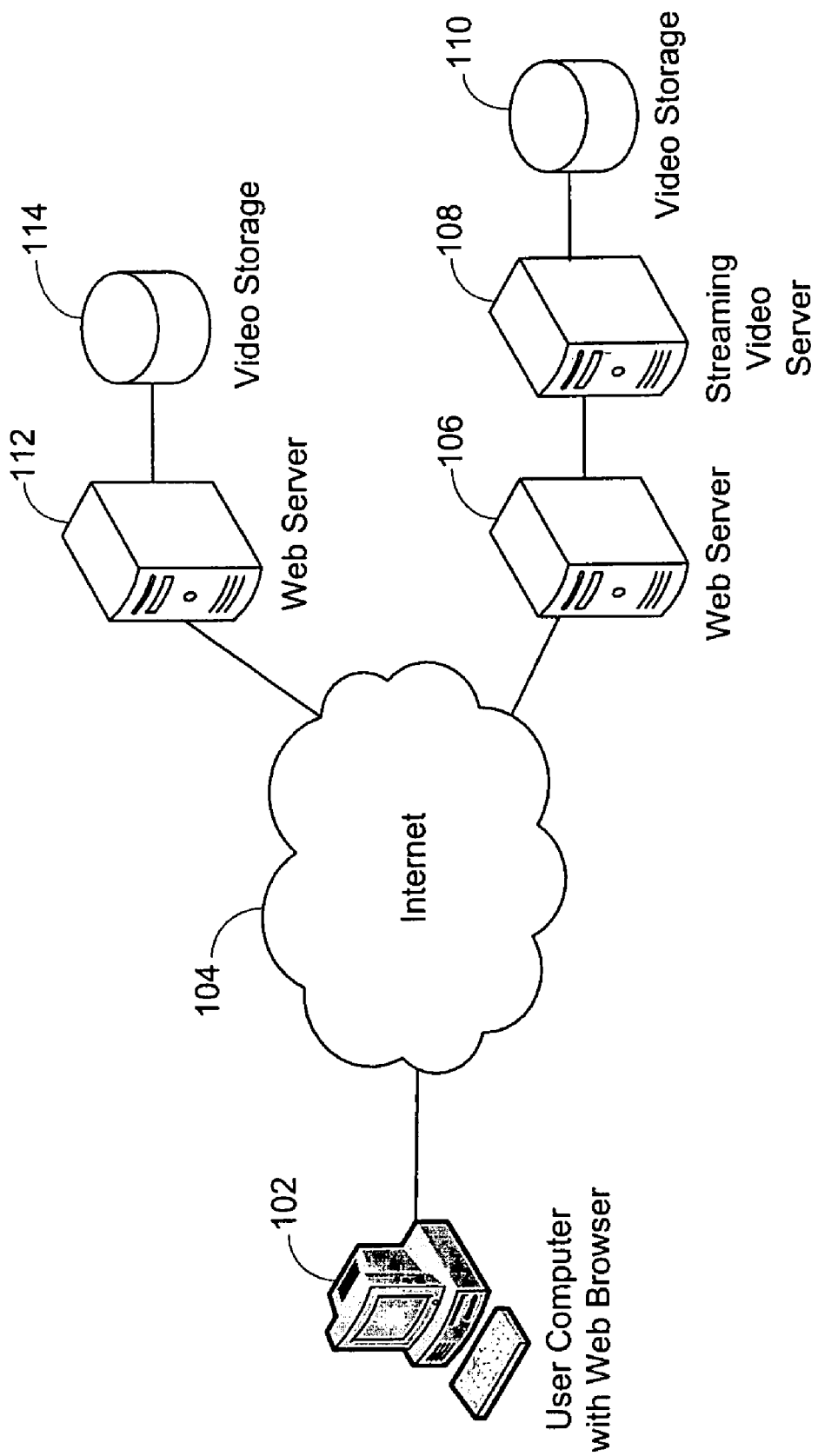
FIG. 1 is a block diagram of the components for viewing video according to the present invention.
Figure 2:
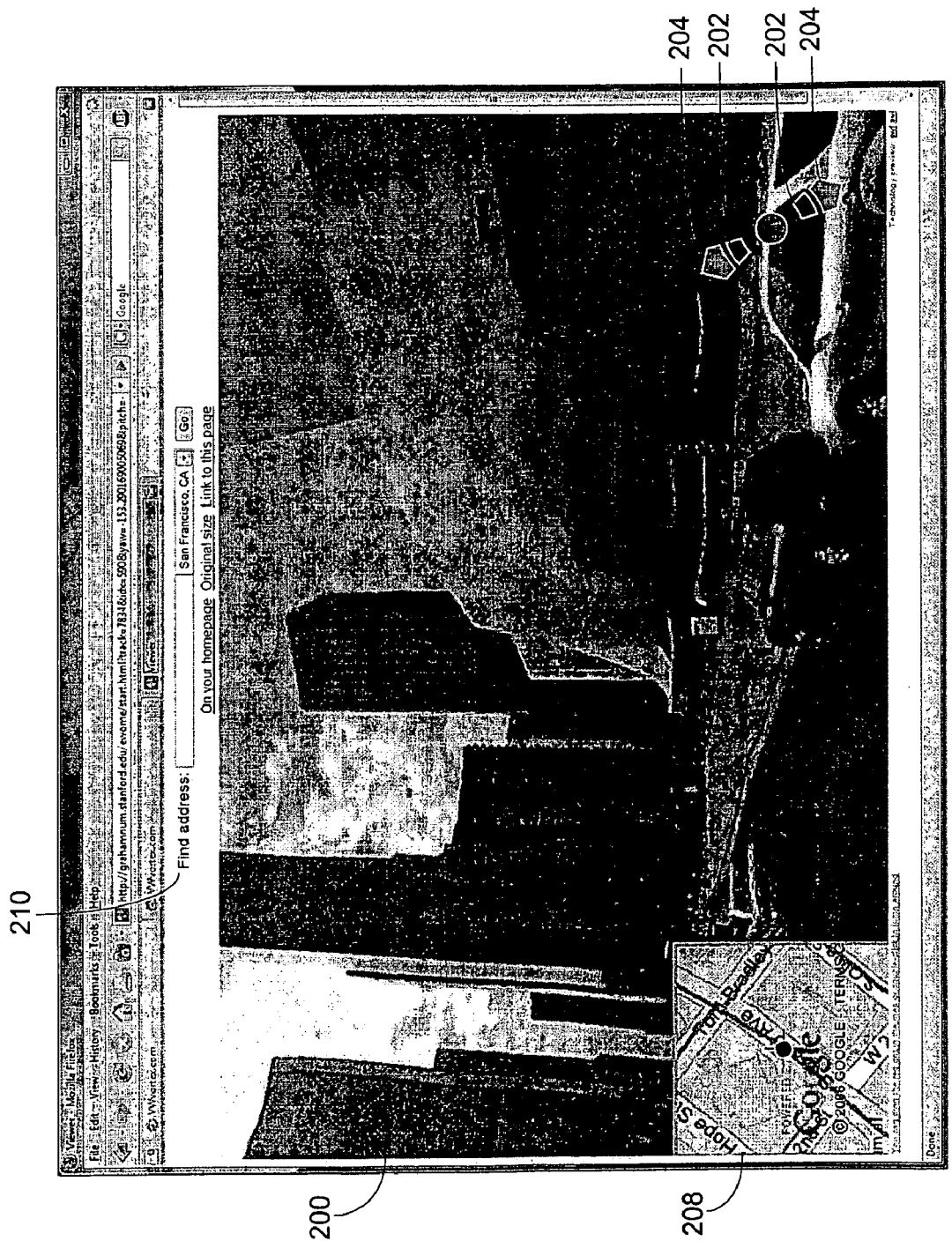
FIGS. 2-7 are screenshots illustrating aspects of the user interface according to the present invention.
Figure 3:
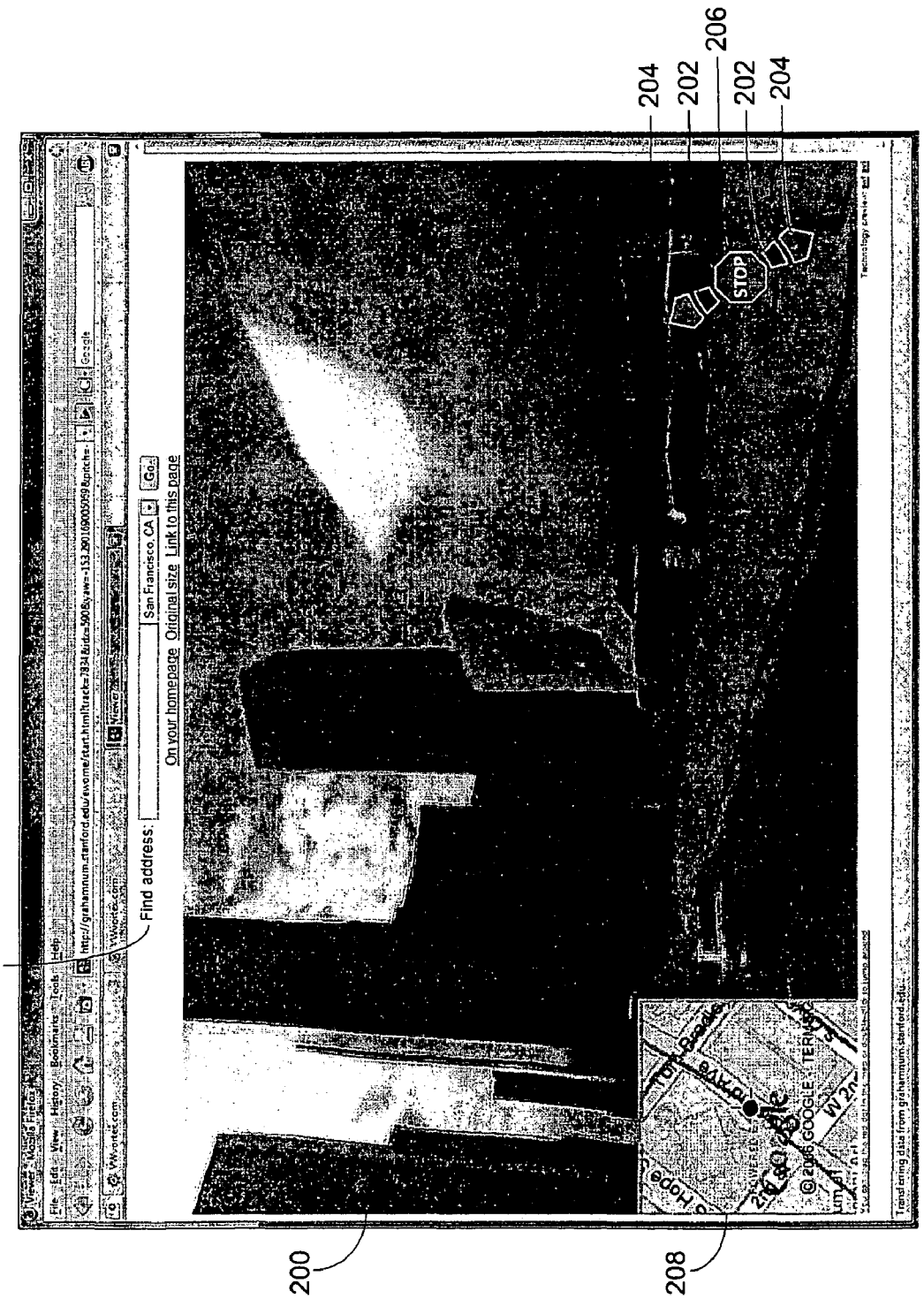
Figure 4:
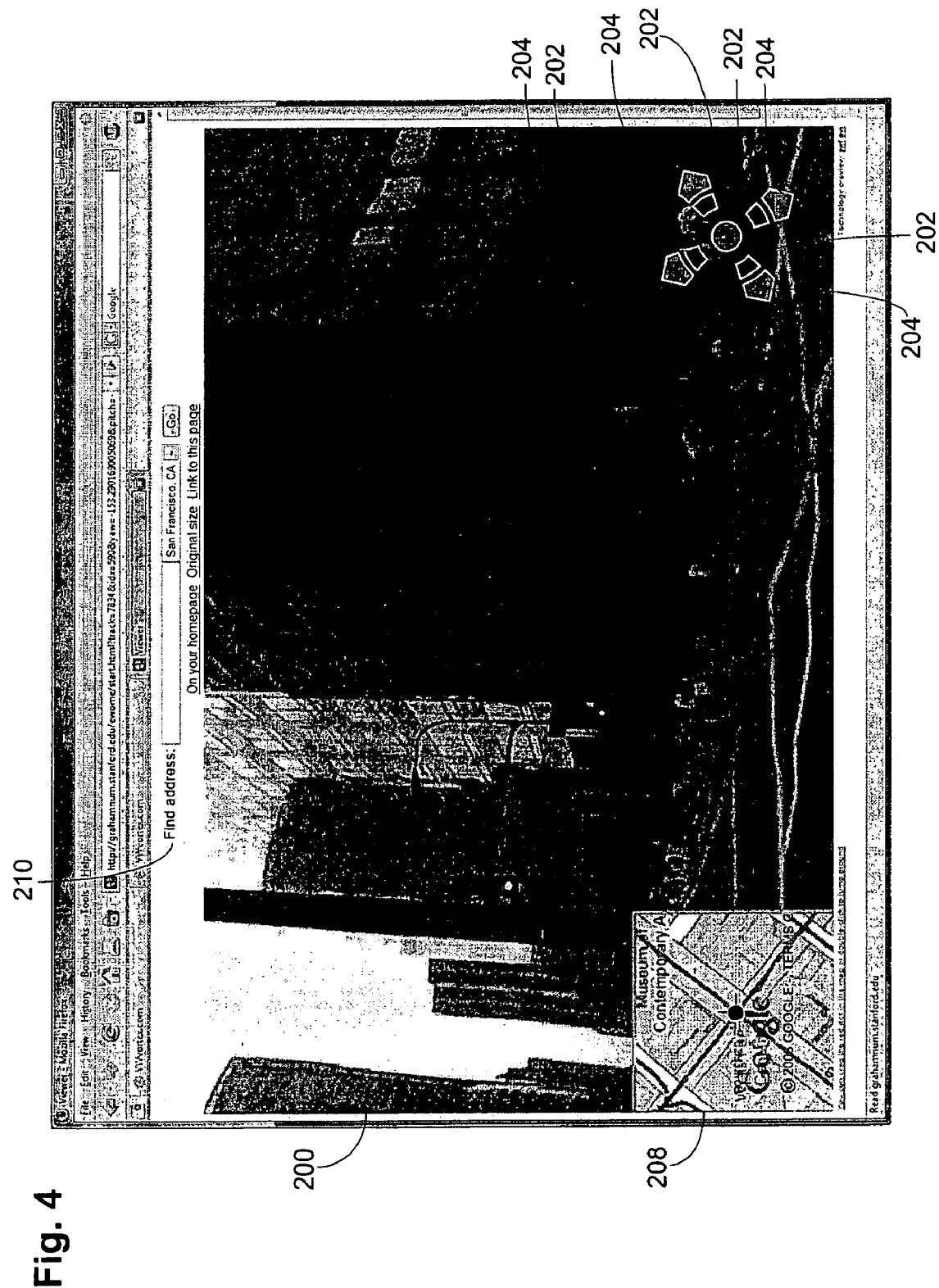

FIG. 1 illustrates exemplary components used in various embodiments. A user computer 102 executing a web browser is connected to a network 104, such as the Internet, to connect in turn to a web server 106. The web server 106 is connected to a streaming video server 108 which processes stored still images and video present on the video storage 110 to provide the desired panoramic images as described below. The streaming video server 108 contains the necessary programs to stream the desired video, to provide desired still images and to provide and interact with a user interface displayed on the user computer 102 in the web browser. In an alternative, a web server 112 contains both the Internet connectivity software of the web server 106 and contains the still image and video software of the streaming video server 108. The web server 112 has its associated video storage 114. This is a simplified illustration and numerous other arrangements of servers and networks can readily be utilized.

Referring now to FIGS. 2-7, the user interface includes two logical parts, a panorama viewer and a panorama display control.

The panorama viewer executes on the streaming video server 108. When the user is at rest, this component receives six rectangular 2D still images and applies them as textures to the faces of a cube to create a full panorama. The user can pan around to look in any direction by using the panorama display control, which provides commands to the panorama viewer. To reduce bandwidth requirements, and decrease the wait time for imagery, the panorama viewer only loads the cube faces currently visible to the user to the browser window 200. As the user pans in the image, other cube faces are loaded as necessary. To further reduce the wait time, three levels of still images exist for each cube face, each with a successively higher jpeg compression quality. The images with the smallest file size are loaded first, and replaced as the larger, higher-resolution images are downloaded. The panorama viewer provides the streaming video to the user browser when the user is not at rest in the panorama. Details on this operation are provided below.

The control for changing the panorama currently displayed is responsive to user actions. The user actions and corresponding changes in the displayed panorama 200 are:

A single-step button 202 for each nearby panorama. A click of the single-step button 202 changes the displayed panorama to the corresponding adjacent one.

A play button 204 for each nearby sequence of panoramas. Clicking this play button 204 begins a video which starts from the current panorama, and displays the imagery from each successive panorama until a stopping point such as an intersection is reached, or the user presses a stop button 206.

If there is currently a video playing, clicking the stop button 206 interrupts that video and triggers the loading of higher-quality still images for the current panorama.

A double-click on any part of the currently displayed panorama sets the currently displayed panorama to whatever panorama has the best view of the indicated object.

A click-and-drag interface allows the user to click on any portion of the visible panorama imagery and drag the mouse to a new position within the visible area. The viewing orientation of the panorama smoothly changes to accommodate this user input, so that at any point in time the pixel that the user clicked on remains under the mouse pointer.

The user is allowed to zoom into or out of the imagery currently displayed. In the preferred embodiment, the user signals this with either the mouse wheel or a combination of keyboard inputs, such as CTRL for zooming out and SHIFT for zooming in. To maintain the illusion of a full 3D panorama, minimum and maximum zoom levels are enforced.

Part of the screen is occupied by an integrated map 208, which displays the current viewpoint in the context of its surroundings. When the user interacts with the panoramic component, this viewpoint in the map 208 is updated in real-time and vice versa. The streets for which panoramic imagery is available are indicated in the map by a coloring schema.

Entry of a street address into a text-box 210 looks up the address in a geocoding database. The system then changes viewpoint of the currently displayed panorama to the geographical coordinates in the image database that is closest to the address given.

Figure 5:
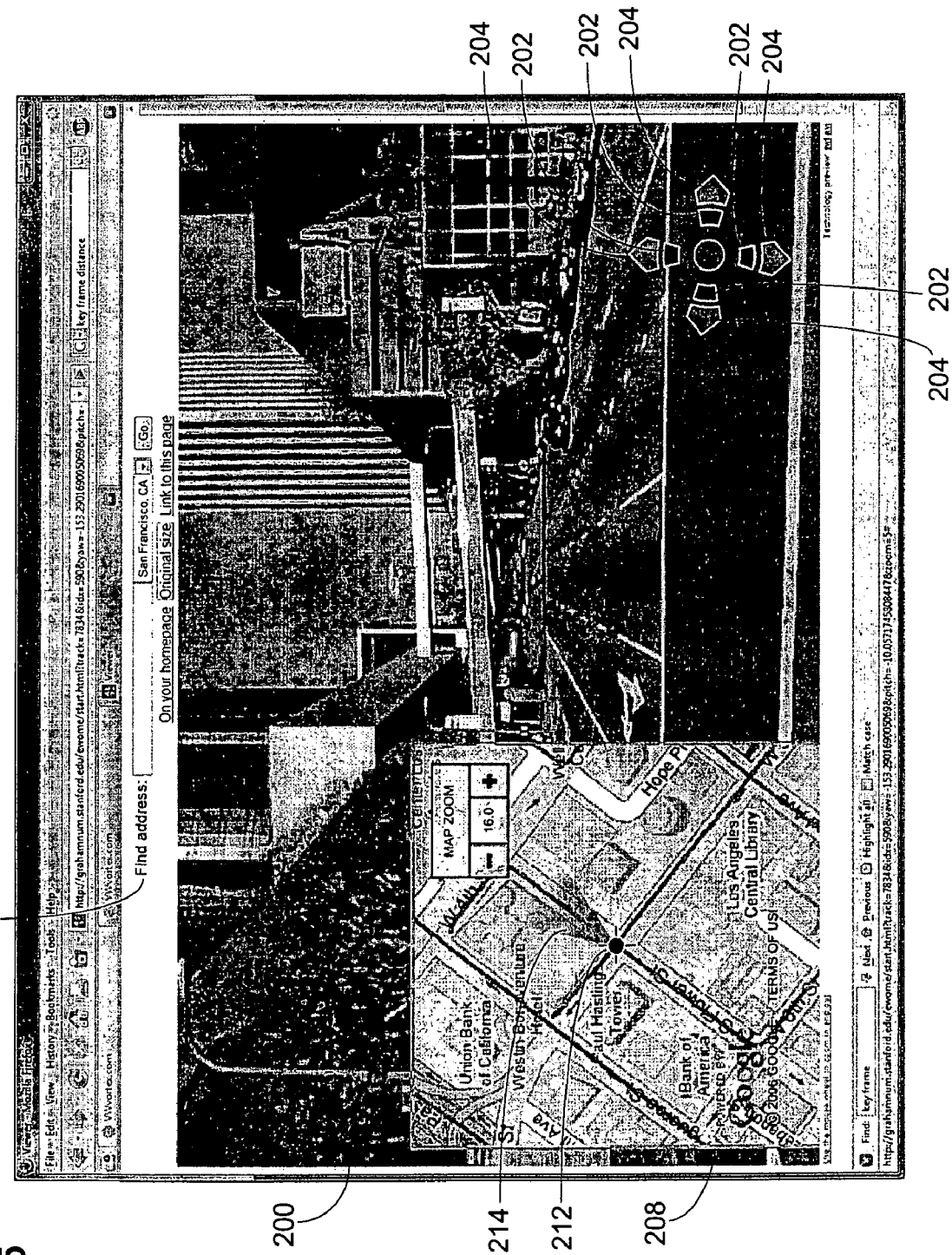
Figure 6:
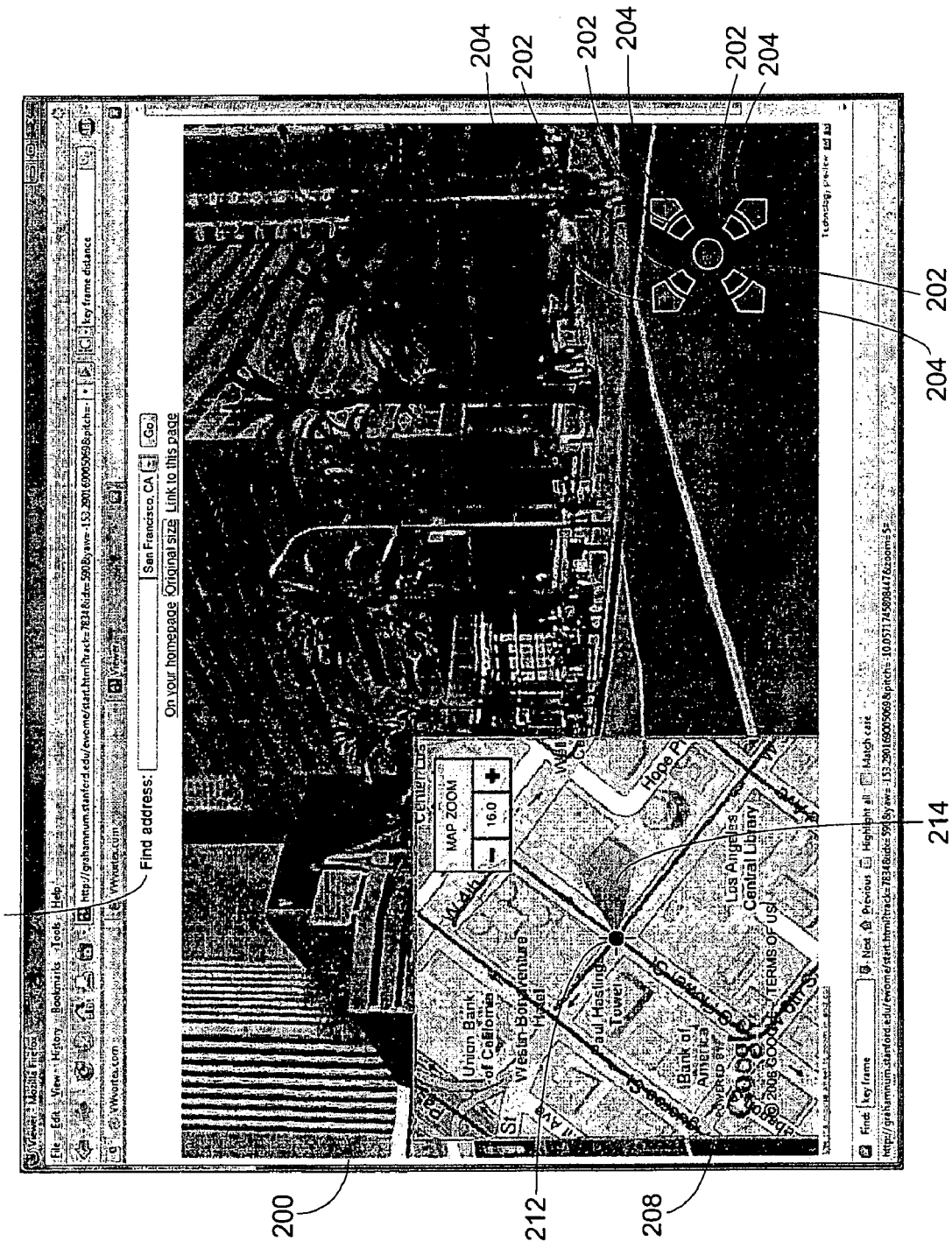
Figure 7:
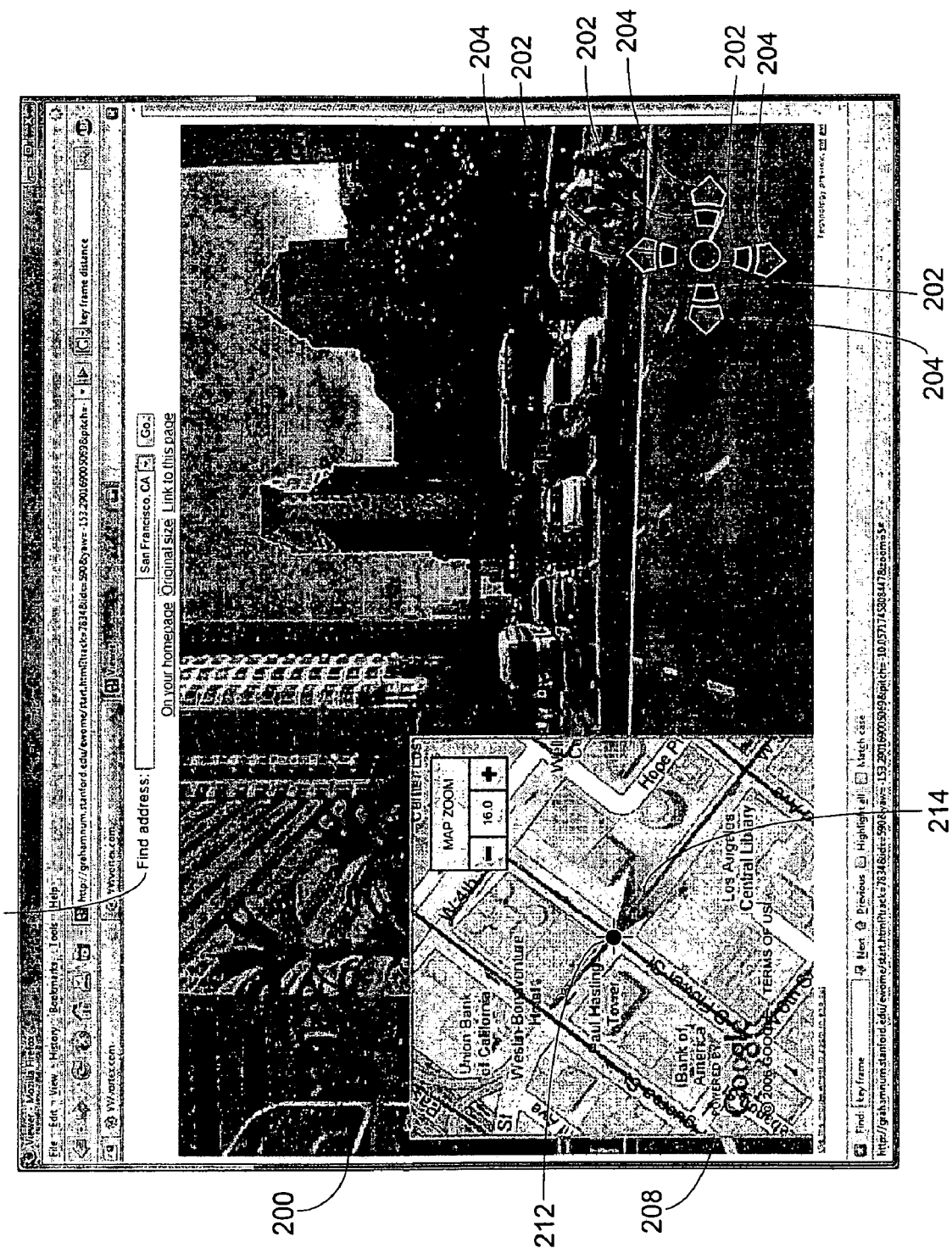

FIGS. 5, 6 and 7 are three views taken at the same location, taken at roughly 45° increments. If the user places the cursor over the map 208, its size increases to ease operations on the map 208. In addition to movement options, such as the double click described above, if the cursor is placed over the map 208 at a location near the indicated user position 212 and in the view field 214, clicking and dragging allows the view field 214 to be easily rotated around the user position 212. In this manner the resultant displayed still panoramas change in 45° increments in FIGS. 5, 6 and 7.

Figure 8:
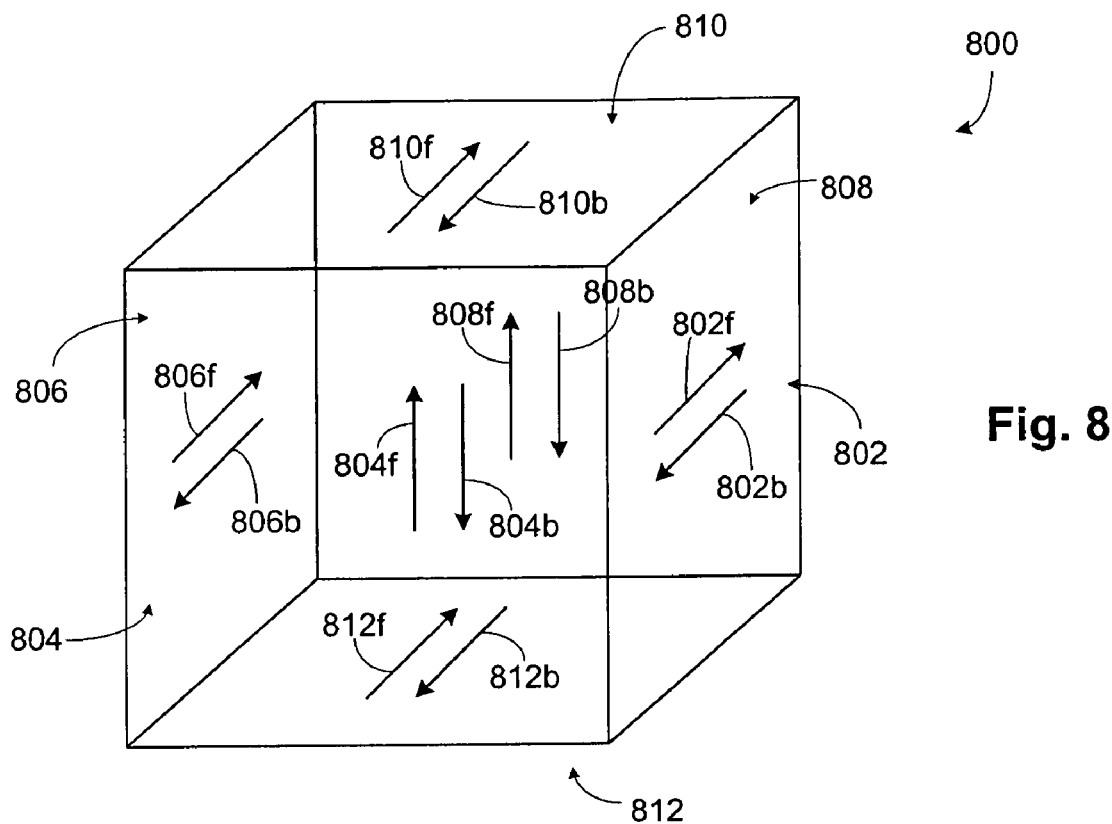
FIG. 8 is a representation of the panorama and related video segments according to the present invention.

Referring to FIG. 8, to implement the video functionality discussed above, the panorama viewer applies 2D video images to the faces of a cube 800, with the cube faces being 802, 804, 806, 808, 810 and 812. After the video images are applied to the cube faces, the resultant 2D video image based on the particular view of the user onto the cube faces is provided to the user for display in the browser. In the preferred embodiment there are six videos, one for each cube face 802-812, for each track. To reduce seek time when changing between adjacent frames, there should be separate sets of videos for going forward and backward along the same track so that there are videos 802$f$, 802$D$, 804$f$, 804$b$, etc. Finally, the videos 802$f$-812$b$ should be encoded at different resolutions and bitrates, so that the video that provides the best trade-off between download wait time and viewing quality can be provided to each user based on connection bandwidth.

Figure 9:
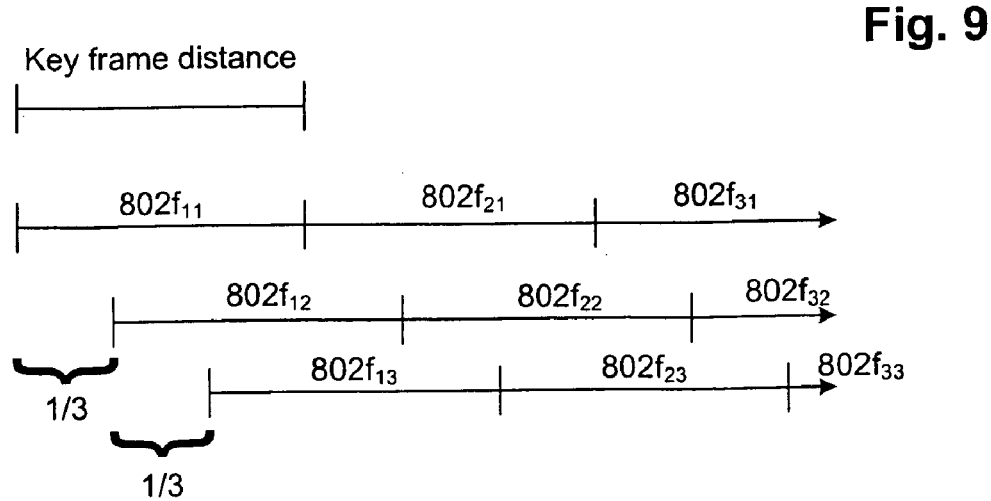
FIG. 9 is a representation of the encoding scheme of the video segments of FIG. 8.

In addition, a preferred video encoding schema minimizes bandwidth and latency for the end-user. Since the user is allowed to jump to a random point on the map 208, the system needs to be able to resume video playback from any such point. The system allows for this functionality by splitting any server video stream into separate video segments instead of one, continuous stream. Referring to FIG. 9, this results in video segments 802$f_{1x}$, 802$f_{2x}$, and 803$f_{3x}$. The video segment lengths correspond to the keyframe distance of the underlying video codec, thus requiring almost no additional bandwidth compared to a single video stream as every keyframe starts in a new video file. As the keyframe distance is relatively short, the size of the video segment is relatively small, allowing faster download, thus further making the system feel more responsive to the user. Furthermore, every location is covered by three separate streams for every direction, whose starting points are spaced apart by ⅓ of the keyframe distance. This results in video segments 802$f_{x1}$, 802$f_{x2}$, and 803$f_{x3}$. This division ensures that for a random user entry point, the nearest video starting point is always less than ⅙th of the keyframe distance away, resulting in a rapid video playback start when requested by the user. Thus the complete forward direction video segment list for the cube face 802 at a single resolution is 802$f_{11}$, 802$f_{21}$, 802$f_{31}$, 802$f_{12}$, 802$f_{22}$, 802$f_{32}$, 802$f_{23}$ and 802$f_{33}$. It is noted that similar sets of video segments are present for each desired resolution, direction and cube face. While this results in a large number of stored video segments, the relatively low cost of storage and the resulting improvement in system response times is considered worth the extra storage costs.

Figure 10:
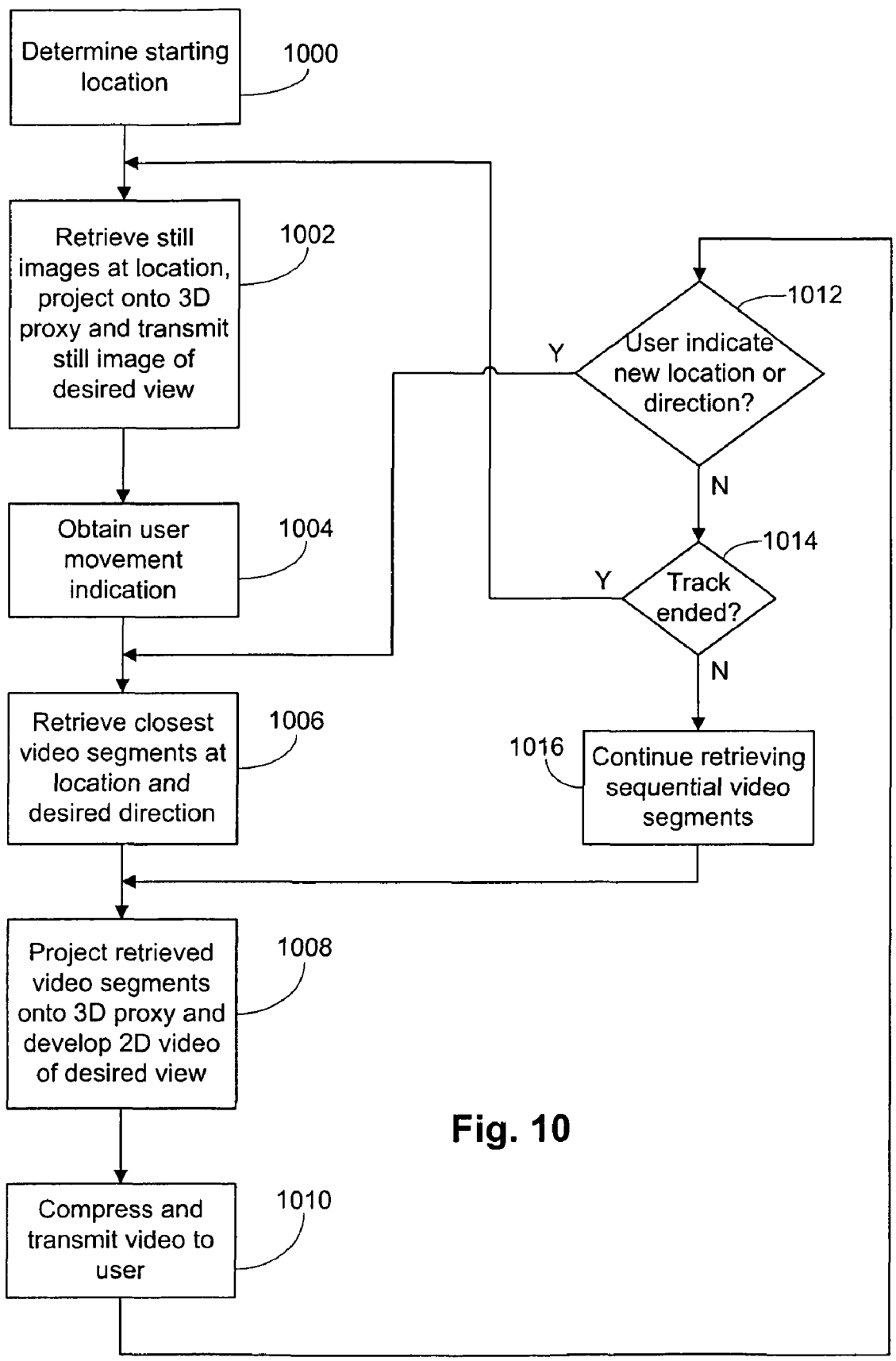
FIG. 10 is a flowchart of system operation according to the present invention.

Proceeding to FIG. 10, operation begins at step 1000 where the starting location is determined. In step 1002 the still images for this location are retrieved, projected on the 3D proxy, the desired 2D image is obtained and transmitted to the user. In step 1004 the user's desired movement indication is received. In step 1006 the closest video segments are retrieved as discussed above. In step 1008 the retrieved video segments are projected onto the 3D proxy and the 2D view of the desired view is obtained. In step 1010 the video is compressed and transmitted to the user.

In step 1012, a determination is made whether the user indicated a new location or direction. If so, operation returns to step 1006 to retrieve the video for the new location. As discussed above, due to the organization the stored video segments, the retrieved video segments will be close to the new location and the transmission can begin very quickly, providing a very responsive system to the user.

If the user has not indicated a new location or direction, in step 1014 it is determined if the particular track has ended or the user has indicated a desire to stop movement along the track. As discussed above, the video segments are for various tracks, with tracks starting and ending at selected locations, such as intersections. If the track has ended or movement is to be stopped, operation returns to step 1002 for delivery of the still image for the location. If not ended or stopping, operation proceeds to step 1016 where the next sequential video segments are retrieved and then to step 1008.

The above disclosure generally describes the preferred embodiment only. Those familiar with the skill in the art recognize that there are many different embodiments of the invention. Hitherto we discuss some of the alternative embodiments. The discussion is provided for purposes of illustration only, and thus does not limit the present invention.

In the preferred embodiment, the video playback rate is constant once video play has commenced. Clearly, any adaptive frame rate that takes into account the number of frames remaining in the video buffer may be used to eliminate any pauses during video playback due to inadequate buffering.

In the preferred embodiment the videos are encoded using a version of the On2 encoder from On2 Technologies. Clearly other encoders could be utilized, such as H-264, MPEG4, MPEG2, WMV9 and the like.

In the preferred embodiment, the panorama viewer uses the proxy of a cube with six texture-mapped faces. Clearly other proxies, such as a sphere, may be used in the panorama viewer. Furthermore, other texture tilings are also possible using more or fewer than 6 tiles to cover the surface of the proxy.

In the preferred embodiment, a specific set of videos is described for reducing wait times when starting video play. The videos in the set vary by which cube face they describe and at what time they start. Clearly you can also have a larger set of videos that vary also by quality, length, frame rate, proxy, texture tiling on the proxy, and other parameters.

In the preferred embodiment, specific user interface elements are described. Clearly one can also use other means of instructing the software to perform its functions, such as pre-recorded user interface actions or using the output of any other software to direct changes.

In the preferred embodiment, a full panorama is intended to be available. Clearly the invention can be used with image data produced by any set of cameras or renderings.

In the preferred embodiment, a single resolution and frame rate are used for all the cube face videos. Clearly one could use different resolutions or frame rates for video faces with low information content (such as those describing the sky or the ground) or faces that are only partially visible in order to reduce bandwidth requirements while maintaining the perceived quality. This could include efforts to maximize the resolution of areas of the video that are the likely target of user foveation while allowing areas in the periphery to be downloaded at reduced bitrates. User foveation could either be determined using monitoring hardware or probabilistic methods based on video content.

In the preferred embodiment, 2D videos and images are downloaded from the server by the client. Clearly any data format could be used including, but not limited to, laser range information, full 3D models, or simplified geometric scene representations.

In the preferred embodiment, the imagery being used is outdoor panoramic imagery. Clearly, any images or data visualization could be used, including, but not limited to, medical imaging data volumes, model-based computer graphics, and microscopy image data sets.

In the preferred embodiment, the display is a 2D browser window on the client computer. Alternatively, any display could be used, including heads-up displays in vehicles, VR goggles, or mobile device screens.

In the preferred embodiment, a rectangular 2D subset of the full panoramic image is used as the visualization framework. Clearly, other visualizations could be used such as a spherical representation of the panoramic image sitting on a plane corresponding to the ground, a set of fixed, static views corresponding to a view of points of interest, such as building facades, or a 2.5 dimensional integration of the panoramic information and strictly 2D information such as maps or satellite imagery.

In the preferred embodiment, the client application is assumed to be a standalone browser window offering the user interface functionality discussed above. Clearly, however, the application could also be embedded within other applications such as a pop-up window triggered by user actions in a 2D map. Alternatively, the application itself could be used as a matrix or portal from which other information or applications with geographic significance could be accessed by the user.

The panoramic projection of 2D images onto a 3D proxy and then developing a 2D view of the projected image is considered known to those skilled in the art. An early example is in the paper by Boult, T. E., "Remote reality via omnidirectional imaging," SIGGRAPH 1998 Technical Sketch, p. 253, which is hereby incorporated by reference. Similar systems were developed by Uyttendaele et al., U.S. Pat. No. 6,968,973 and Foote et al., U.S. Pat. No. 7,096,428, both of which are hereby incorporated by reference. A further improvement in these systems is provided in Arfvidsson et al. U.S. patent application Ser. No. 11/837,224 entitled "System and Process for Synthesizing Location-Referenced Panoramic Images and Video," filed Aug. 10, 2007, which is hereby incorporated by reference. Other techniques and embodiments will be well known to those skilled in the art.

While the invention has been particularly shown and described with respect to preferred embodiments thereof, it will be understood by those skilled in the art that changes in form and details may be made therein without departing from the scope and spirit of the invention.

The invention claimed is:

1. A method for organizing and delivering compressed video for streaming panoramic video to a user, the panoramic video obtained by projecting two dimensional video onto a three dimensional proxy and developing a two dimensional video of a desired view, the method comprising the steps of:
   for a given location, storing a series of sequential, two dimensional, compressed video segments along a movement track in first and second directions for each of a plurality of viewable surfaces of the three dimensional proxy as separate video segment files, each of said video segment files having a length of approximately one keyframe distance, each keyframe distance including a plurality of frames, with every keyframe starting a different video segment file; and
   retrieving the video segment files appropriate for providing the user a streamed video in a desired direction for projection.

2. The method of claim 1, wherein each stored video segment file in each direction overlaps at least one other stored video segment file and starts a portion of a keyframe distance from the overlapping stored video segment files.

3. The method of claim 2, wherein a user may select a second location and direction after being at a first location, the method further comprising the step of:
   retrieving the video segment files closest to the second location and of the correct direction, said closest video segment file being selected based on both the keyframe distance and the portion of the keyframe distance of the second location.

4. The method of claim 2, wherein the three dimensional proxy is a cube, the viewable surfaces are the cube faces and the directions are forward and backward.

5. The method of claim 2, wherein the portion of the keyframe distance is one-third.

6. The method of claim 2, wherein each video segment is stored in a plurality of combinations of resolutions and bit rates.

7. The method of claim 2, further comprising the steps of:
   storing compressed still images having a resolution higher than the retrieved video segment file corresponding to selected locations; and
   retrieving said compressed still images related to a particular location if movement has stopped at the selected location.

8. The method of claim 2, further comprising the steps of:
   projecting the retrieved video segments onto the three dimensional proxy and developing a two dimensional video segment of a desired view;
   compressing the developed two dimensional video segment; and
   providing the compressed video segment to the user.

9. The method of claim 1, wherein a user may select a second location and direction after being at a first location, the method further comprising the step of:
   retrieving the video segment files closest to the second location and of the correct direction, said closest video segment file being selected based on the keyframe distance.

10. The method of claim 1, wherein the three dimensional proxy is a cube, the viewable surfaces are the cube faces and the directions are forward and backward.

11. The method of claim 1, wherein each video segment is stored in a plurality of combinations of resolutions and bit rates.

12. The method of claim 1, further comprising the steps of:
storing compressed still images having a resolution higher than the retrieved video segment file corresponding to selected locations; and
retrieving said compressed still images related to a particular location if movement has stopped at the selected location.

13. The method of claim 1, further comprising the steps of:
projecting the retrieved video segments onto the three dimensional proxy and developing a two dimensional video segment of a desired view;
compressing the developed two dimensional video segment; and
providing the compressed video segment to the user.

14. A non-transitory machine-readable medium having machine-executable instructions for performing a method for streaming panoramic video to a user, the method comprising the steps of:
retrieving video segments appropriate for providing the user a streamed video in a desired direction, the video segments stored as a series of sequential, two dimensional, compressed video segments along a movement track in first and second directions for each of a plurality of viewable surfaces of a three dimensional proxy as separate video segment files, each of said video segment files having a length of approximately one keyframe distance, each keyframe distance including a plurality of frames, with every keyframe starting a different video segment file;
projecting the retrieved video segments onto the three dimensional proxy and developing a two dimensional video segment of a desired view;
compressing the developed two dimensional video segment; and
providing the compressed video segment to the user.

15. The non-transitory machine-readable medium of claim 14, wherein each stored video segment file in each direction overlaps at least one other stored video segment file and starts a portion of a keyframe distance from the overlapping stored video segment file.

16. The non-transitory machine-readable medium of claim 15, wherein a user may select a second location and direction after being at a first location, the method further comprising the step of:
retrieving the video segment files closest to the second location and of the correct direction, said closest video segment file being selected based on both the keyframe distance and the portion of the keyframe distance of the second location.

17. The non-transitory machine-readable medium of claim 15, wherein the three dimensional proxy is a cube, the viewable surfaces are the cube faces and the directions are forward and backward.

18. The non-transitory machine-readable medium of claim 15, wherein the portion of the keyframe distance is one-third.

19. The non-transitory machine-readable medium of claim 15, wherein each video segment is stored in a plurality of combinations of resolutions and bit rates and the retrieved video segments are those that provide the best trade-off between download wait time and viewing quality based on connection bandwidth.

20. The non-transitory machine-readable medium of claim 15, the method further comprising the steps of:
retrieving compressed still images related to a particular location if movement has stopped at the selected location, the compressed still images having a resolution higher than the retrieved video segment file corresponding to selected location; and
providing the compressed still images to the user.

21. The non-transitory machine-readable medium of claim 14, wherein a user may select a second location and direction after being at a first location, the method further comprising the step of:
retrieving the video segment files closest to the second location and of the correct direction, said closest video segment file being selected based on the keyframe distance.

22. The non-transitory machine-readable medium of claim 14, wherein the three dimensional proxy is a cube, the viewable surfaces are the cube faces and the directions are forward and backward.

23. The non-transitory machine-readable medium of claim 14, wherein each video segment is stored in a plurality of combinations of resolutions and bit rates and the retrieved video segments are those that provide the best trade-off between download wait time and viewing quality based on connection bandwidth.

24. The non-transitory machine-readable medium of claim 14, further comprising the steps of:
retrieving compressed still images related to a particular location if movement has stopped at the selected location, the compressed still images having a resolution higher than the retrieved video segment file corresponding to selected location; and
providing the compressed still images to the user.

* * * * *